F. BUSCHER.
Improvement in Clap Boards.
No. 122,562.   Patented Jan. 9, 1872.
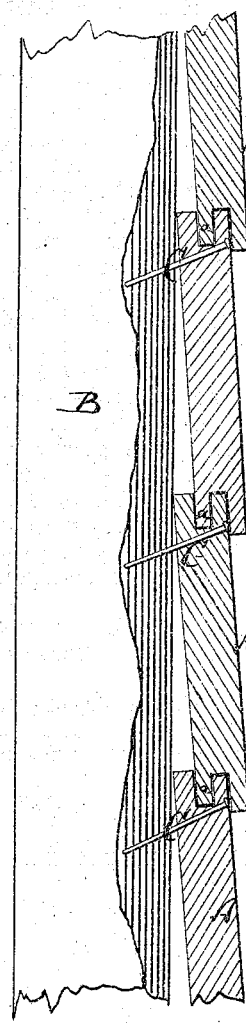
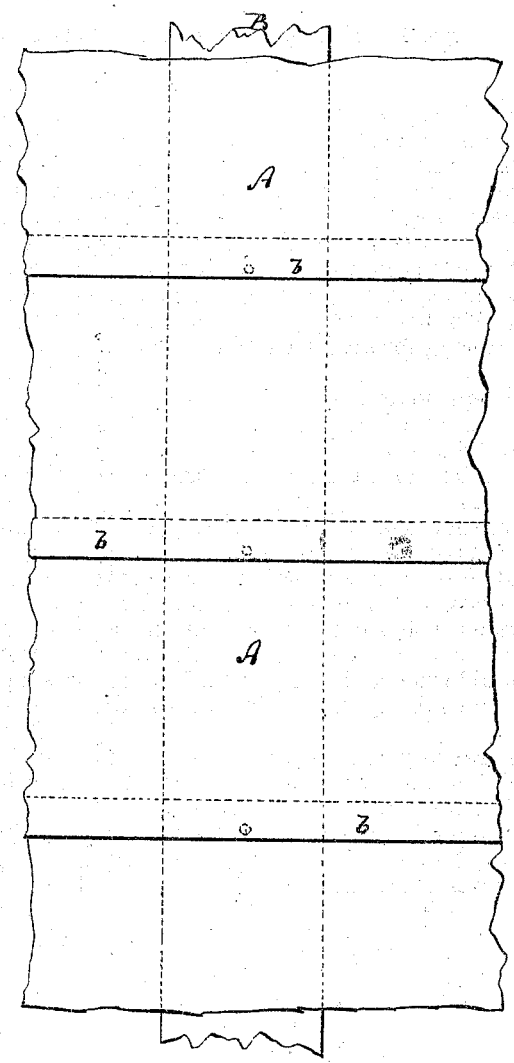

No. 122,562

UNITED STATES PATENT OFFICE.

FRANZ BUSCHER, OF DUNKIRK, NEW YORK.

IMPROVEMENT IN CLAPBOARDING.

Specification forming part of Letters Patent No. 122,562, dated January 9, 1872.

*To all whom it may concern:*

Be it known that I, FRANZ BUSCHER, of Dunkirk, in the county of Chautauqua and State of New York, have invented a new and useful Improvement in Clapboard; and I do hereby declare that the following is a full, clear, and exact description thereof, which will enable others skilled in the art to make and use the same, reference being had to the accompanying drawing forming part of this specification.

Figure 1 represents a vertical transverse section of my improved clapboarding. Fig. 2 is a face view of the same.

Similar letters of reference indicate corresponding parts.

This invention has for its object to prevent the frequent cracking of clapboards on houses, and provide a reliable connection between the several boards and hide the fastening-nails. My invention consists in the method of uniting and putting on clapboards, to prevent cracking and to hide the nails, as hereinafter fully described, and subsequently pointed out in the claim.

A in the drawing are the clapboards grooved on top and bottom. They are interlocked so that the inner tongue *a* at the lower end of each board enters the groove on top of the board below, the outer lower tongue *b* overlapping said lower board, as shown.

The clapboards are applied as follows: The lowermost board is first put on in proper position, and nailed to the scantlings or uprights B by nails C, which are put through the upper part of the board. The next board is then put upon the first, so that the tongue *b* will cover the nails of the former, and so that also the lower board will bodily sustain the upper. This being nailed on top, serves again to support the next board above, and so forth. After the lower board has been properly righted none of those above need be adjusted, as the upper edge of every lower board will constitute a reliable guide for the upper. The labor of clapboarding is thus greatly reduced.

Boards grooved as shown can only properly be made of strong material. The half-inch clapboards hitherto usually employed will therefore hardly answer my purpose. I intend to use them of about seven-eighths or one inch thickness.

Having thus described my invention, I claim as new and desire to secure by Letters Patent—

The clapboards A having tongues *a b* applied to the uprights B so as to lock together and cover the nails C, in the manner and for the purpose specified.

FRANZ BUSCHER.

Witnesses:
CHRISTIAN HEINTZ,
ALEXANDRE STUTTER.

(30)